C. ELLIS.
HYDROGEN CIRCULATION PROCESS.
APPLICATION FILED OCT. 14, 1916.
1,342,668.
Patented June 8, 1920.
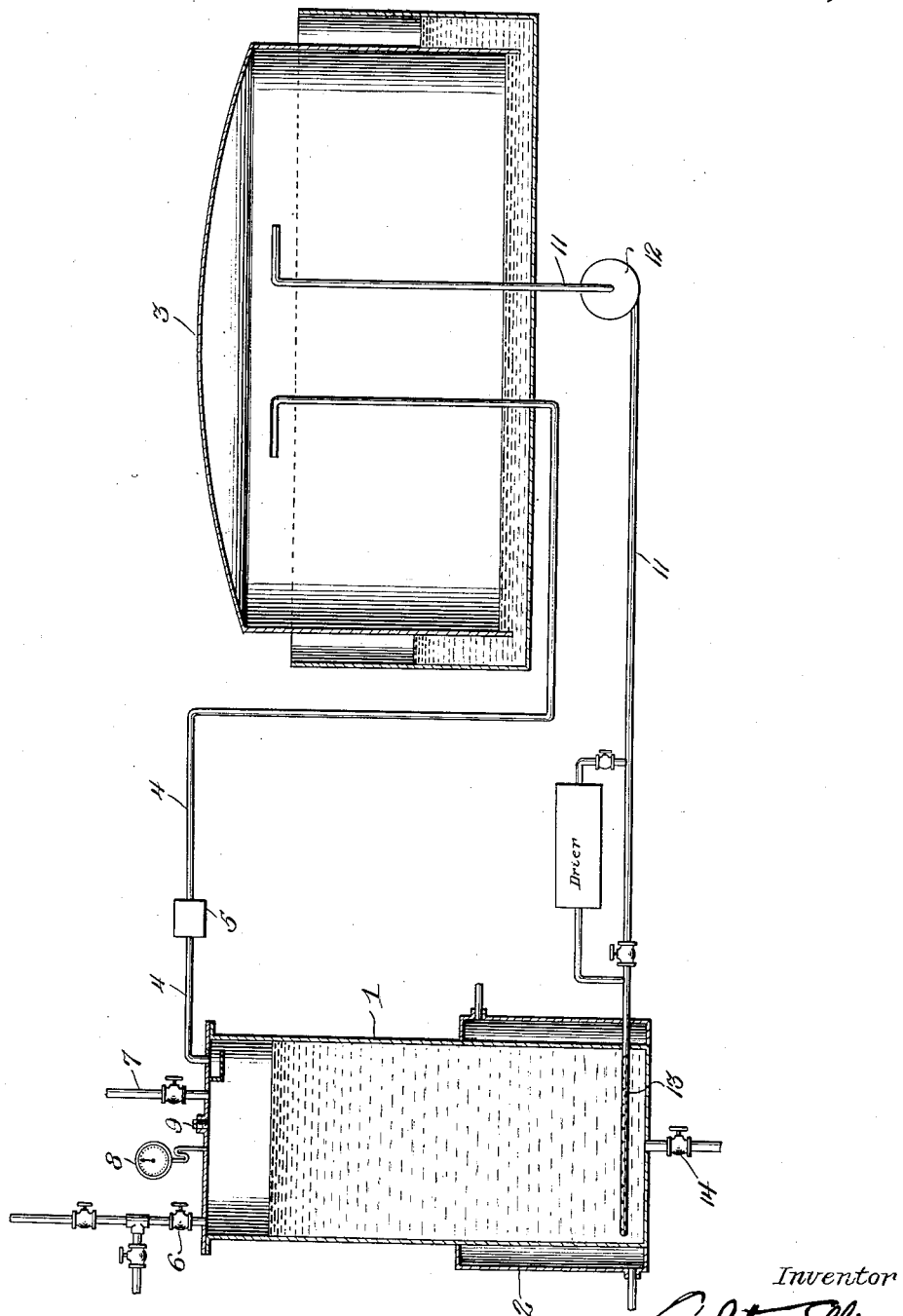

UNITED STATES PATENT OFFICE.

CARLETON ELLIS, OF MONTCLAIR, NEW JERSEY.

HYDROGEN-CIRCULATION PROCESS.

1,342,668.     Specification of Letters Patent.     Patented June 8, 1920.

Application filed October 14, 1916. Serial No. 125,635.

*To all whom it may concern:*

Be it known that I, CARLETON ELLIS, a citizen of the United States, residing at Montclair, in the county of Essex and State of New Jersey, have invented certain new and useful Improvements in Hydrogen-Circulation Processes, of which the following is a specification.

In several published patents it has been proposed to circulate hydrogen through a body of oily or other organic material in the presence of a catalyst, and in carrying out this process with fatty oils, and some other supposedly non-volatile organic materials, there is picked up by the gas, during its passage through the oily or other organic material, a substance, of which the chemical composition is not entirely definite, but which appears in some respects to resemble bodies like acrolein, (substance produced by overheating fatty oil) which substance if passed back into contact with the catalytic material, particularly if the latter be in a particularly sensitive state, acts as a catalyzer poison, or in other words reduces the catalytic activity of the catalyst. It has been proposed in the processes employing the circulation of hydrogen, to bubble the hydrogen through purifying liquids, or to pass the hydrogen through purifying agents, or in contact therewith, and it has also been proposed to pass the hydrogen through driers to remove moisture therefrom, during the circulation of the hydrogen.

It appears however that the impurities in the gas are not completely removed, even if, in some cases, the gas be passed in succession through caustic alkali solution, potassium permanganate solution and strong sulfuric acid, and even if the gaseous current be passed several times through such a series of purifiers, the purification under the circumstances is not sufficiently complete to prevent injury of the catalyst. If however, the hydrogen, after being passed through the oil or other organic material is then passed into a gasometer of such a size relative to the capacity of the hydrogenating vessel that the hydrogen remains for a considerable time in this gasometer, the impurities in question will be largely removed from the gas, without resorting necessarily to chemical treatment in addition.

A gasometer having water in its bottom, as the sealing fluid is advisable, although a dry gasometer may be used in some cases. The hydrogen, or gas containing hydrogen, will preferably not be kept absolutely quiet in this gasometer, but a small amount of motion to the gas, such for example as that produced by passing the gas into the gasometer through an ordinary pipe, or that produced by leading the gas from the gasometer, by an ordinary pipe, giving sufficient motion to keep the hydrogen in the gasometer in a substantially uniform condition, which aids in the auto-purification of the hydrogen, or gas containing hydrogen.

In some instances it might be advisable to allow a gasometer full of hydrogen to stand for some time, in which case the sun shining on one side of the gasometer would produce a sufficient amount of motion of the gas in the gasometer, to effect the result of maintaining the gas mixture substantially uniform therein.

In my copending application 808,461, filed December 23, 1913, and 165,974, filed May 2, 1917, continuation thereof, I have shown and claimed a plurality of gasometers, with means for passing the hydrogen-containing gas from one gasometer to the other, through a body of oil undergoing treatment, and I have shown a heat interchanger, arranged to transfer heat units from the gas leaving the hydrogenation vessel to the gas about to enter the same. The use of such a pair of gasometers, would allow, in case the gasometers and hydrogenation vessel were of the proper sizes relatively to each other, the use of the present invention.

In my copending application 14,524, filed March 15, 1915, I have described the use of a gasometer in a circulatory hydrogenation process, and if the hydrogen vessel and gasometer are of the proper relative sizes the object of the present invention could be effected by the use of such an apparatus as is there described. Without limiting myself to particular proportions, it appears that the amount of gas in the gasometer or plurality of gasometers, at all times should preferably be not less than from 5 to 10 times the total amount of hydrogen in the remaining parts of the system.

By allowing the hydrogen gas containing the impurities to enter and remain in a gasometer of the usual floating type, from which hydrogen may be constantly withdrawn for passing through the oily material, the impurities in question will settle out or be removed from the hydrogen, almost completely, without any chemical treatment, and will be removed more completely than would be produced by ordinary passage of the gas through the powerful chemical purifying agents above referred to.

The hydrogen leaving the gasometer to be again circulated in the process, can be further purified and dried if desired, by passage through or in contact with appropriate chemical agents. Or, if desired, chemical purification may be resorted to prior to entry of the used gas into the gasometer and drying of the gas may be effected on its exit from the said gasometer after settling or "clarification."

It is difficult to explain just why the impurities referred to are not readily or completely removed from the gas by treatment with such drastic purifying agents as strong alkali, permanganate of potash, or sulfuric acid. An explanation perhaps may be found in the phenomenon of suspensions of solid or liquid bodies in gases under certain conditions. While chemically such suspensions should be responsive to and absorbed by purifying solutions of strong reagents they are known to occur in a state which precludes absorption. The storage of the used gas containing such suspended or dissolved material enables the coagulation or collection and settling or elimination of the latter in some way which is advantageous in conducting the catalytic hydrogenation of fatty oils (of which ordinary cottonseed oil is a type). It may also be possible to employ an electrical discharge of high tension to bring about the deposition and collection of a part at least of the material which is responsible for the subsequent effect of the gas when re-used on the catalytic material employed.

Without limiting myself to the use of any particular apparatus, I have shown, in the annexed drawing, an apparatus which may be used in carrying out the process of the present application, said drawing showing a vertical section (partly in elevation) of a suitable apparatus. In said drawing 1 represents a suitable hydrogenation receptacle, provided with a heating jacket 2, or other heating means, and 3 is a gasometer of the "floating" or "bell" type. 4 is an outlet for unabsorbed hydrogen provided if desired with pressure-reducing valve 5. 6 is an oil inlet, 7 is a catalyzer inlet, 8 is a pressure gage, 9 is a removable plug for cleaning or inspection. 11 is a pipe for supplying hydrogen to the hydrogenation vessel, which is provided with a pump 12, and the pipe 11 terminates in a perforated ring-shaped portion 13, within the hydrogenation vessel. 14 is an outlet for the treated oil. It will be obvious that the pipes should be provided with valves.

The hydrogen from the gasometer 3 passes by pipe 11, and pump 12, through the perforations in 13, a part only thereof being absorbed each time in the oil, and the unabsorbed portion, with whatever it may pick up from the oil (steam, vaporized oil, vaporous decomposition products of oil, etc.) pass by pipe 4, past reducing valve 5 into gasometer 3. Here the hydrogen, while being somewhat agitated by the incoming and outgoing currents of gas, will remain for some time, most of the hydrogen which enters through pipe 4 will remain for a much longer time in the gasometer 3 than the length of time it was in the oil-treating vessel, owing to the differences of size of these two vessels.

What I claim is:

1. The herein described process which comprises providing a bulk of hydrogen many times greater than the capacity of the gas space in a hydrogenating vessel, said hydrogen being in contact with a liquid capable of taking up impurities having catalyzer-poisoning properties, and circulating hydrogen from said bulk through said hydrogenating vessel and back to said bulk, while the latter contains a reducible organic material and a catalyst, while allowing at least the major part of the hydrogen to remain in said bulk until a considerable part of the catalysis-inhibiting impurities have settled therefrom.

2. In the hydrogenation of organic material containing unsaturated bodies, the improvement which comprises passing a current of hydrogen-containing gas into and out of contact with the said organic material while in the presence of a catalyst, withdrawing the unabsorbed gas from contact with the said organic material, passing the gas so withdrawn to a bulk of gaseous medium, suitable for use as a hydrogenating gas, which bulk is materially greater than the volume of gas in contact with the said organic material, and allowing at least the greater part of such withdrawn gas to remain in contact with water for a length of time materially greater than the length of time that it is in contact with the said organic material, and then again passing the same into contact with said organic material.

3. A process which comprises bubbling a current of a hydrogen-containing gas through a liquid organic material containing unsaturated bodies, in the presence of a catalyst capable of causing the union of such unsaturated bodies with hydrogen to produce more completely saturated bodies, such gas being passed into said liquid at a rate more rapid than the rate of absorption therein, so that unabsorbed gas leaves the said organic material, rapidly withdrawing the gas not absorbed in said organic material from contact therewith, to a bulk of hydrogen-containing gas which bulk is many times greater than the volume of gas in contact with the liquid organic material at any given time, and passing gas from said bulk through said liquid organic material, whereby any particular portion of the said gas tends to remain out of contact with the organic material during the major portion of the time, and whereby substances picked up by the gas in its travel through the said organic material will have an opportunity to settle therefrom while in said bulk.

In testimony whereof I affix my signature.

CARLETON ELLIS.